(12) United States Patent
Ke

(10) Patent No.: US 8,984,171 B2
(45) Date of Patent: Mar. 17, 2015

(54) DATA STORAGE DEVICE AND FLASH MEMORY CONTROL METHOD

(71) Applicant: Silicon Motion, Inc., Jhubei, Hsinchu County (TW)

(72) Inventor: Kuan-Yu Ke, Jhubei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 0 days.

(21) Appl. No.: 14/100,627

(22) Filed: Dec. 9, 2013

(65) Prior Publication Data

US 2014/0250259 A1    Sep. 4, 2014

(30) Foreign Application Priority Data

Mar. 1, 2013 (TW) .............. 102107205 A
Mar. 1, 2013 (TW) .............. 102107206 A

(51) Int. Cl.
*G06F 12/00* (2006.01)
*G06F 12/02* (2006.01)
*G06F 3/06* (2006.01)
*G06F 13/00* (2006.01)

(52) U.S. Cl.
CPC ................... *G06F 12/0246* (2013.01)

USPC .............. 710/3; 710/2; 710/5; 710/8; 710/11; 710/15

(58) Field of Classification Search
None
See application file for complete search history.

(56) References Cited

U.S. PATENT DOCUMENTS

2003/0041188 A1*    2/2003    Han et al. ................ 710/11

* cited by examiner

*Primary Examiner* — Scott Sun
(74) *Attorney, Agent, or Firm* — McClure, Qualey & Rodack, LLP

(57) ABSTRACT

A data storage device and a FLASH memory control method with a cache space. The FLASH memory control method includes the following steps: using a plurality of channels to access a FLASH memory, wherein the FLASH memory has a plurality of blocks each with a plurality of pages, and the blocks are grouped to be accessed by the different channels; allocating a random access memory to provide a cache space, the cache space having a plurality of cache areas caching write data for the different channels, respectively; distributing the data issued from a host to correspond to the different channels; and reusing a latest-updated cache area of the cache space to cache write data when a logical address requested to be written with data is identical to a logical address that the latest-updated cache area corresponds to.

12 Claims, 6 Drawing Sheets

DATA STORAGE DEVICE AND FLASH MEMORY CONTROL METHOD

CROSS REFERENCE TO RELATED APPLICATIONS

This Application claims priority of Taiwan Patent Applications No. 102107205 and No. 102107206, filed on Mar. 1, 2013, the entirety of which is incorporated by reference herein.

BACKGROUND OF THE INVENTION

1. Field of the Invention

The present invention relates to a data storage space with a FLASH memory and a FLASH memory control method.

2. Description of the Related Art

FLASH memory is commonly used as a storage medium in today's data storage devices. A NAND Flash, for example, is primarily used in memory cards, USB flash devices, solid-state drives and so on. By a multi-chip package technique, a NAND FLASH chip and a controller chip may be combined into one package, named eMMC (embedded MultiMediaCard).

Today, FLASH memory is widely used with considerably increased storage capacity. For FLASH memory, however, the huge storage capacity may considerably affect the operation efficiency.

BRIEF SUMMARY OF THE INVENTION

A data storage device with a FLASH memory and a FLASH memory control method are disclosed.

A data storage device in accordance with an exemplary embodiment of the disclosure comprises a FLASH memory and a controller coupled to the FLASH memory. The FLASH memory comprises a plurality of blocks and each block comprises a plurality of pages. The blocks are grouped to be accessed via different channels. The controller comprises a processing unit, a read-only memory and a random access memory. The codes loaded in the read only memory are executed by the processing unit as firmware of the data storage device. The random access memory is allocated by the processing unit executing the firmware, to provide a cache space. The cache space comprises a plurality of cache areas, caching write data for the different channels, respectively. By the processing unit executing the firmware, data issued from a host is distributed to correspond to the different channels. When a logical address requested to be written with data is identical to a logical address that a latest-updated cache area of the cache space is allocated to, the processing unit executing the firmware reuses the latest-updated cache area to cache write data.

In another exemplary embodiment of the disclosure, a FLASH memory control method is shown, which comprises the following steps: using a plurality of channels to access a FLASH memory, wherein the FLASH memory comprises a plurality of blocks each with a plurality of pages, and the blocks are grouped to be accessed by the different channels; allocating a random access memory to provide a cache space, the cache space comprising a plurality of cache areas caching write data for the different channels; distributing the data issued from a host to correspond to the different channels; and reusing a latest-updated cache area of the cache space to cache write data when a logical address requested to be written with data is identical to a logical address that the latest-updated cache area is allocated to.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
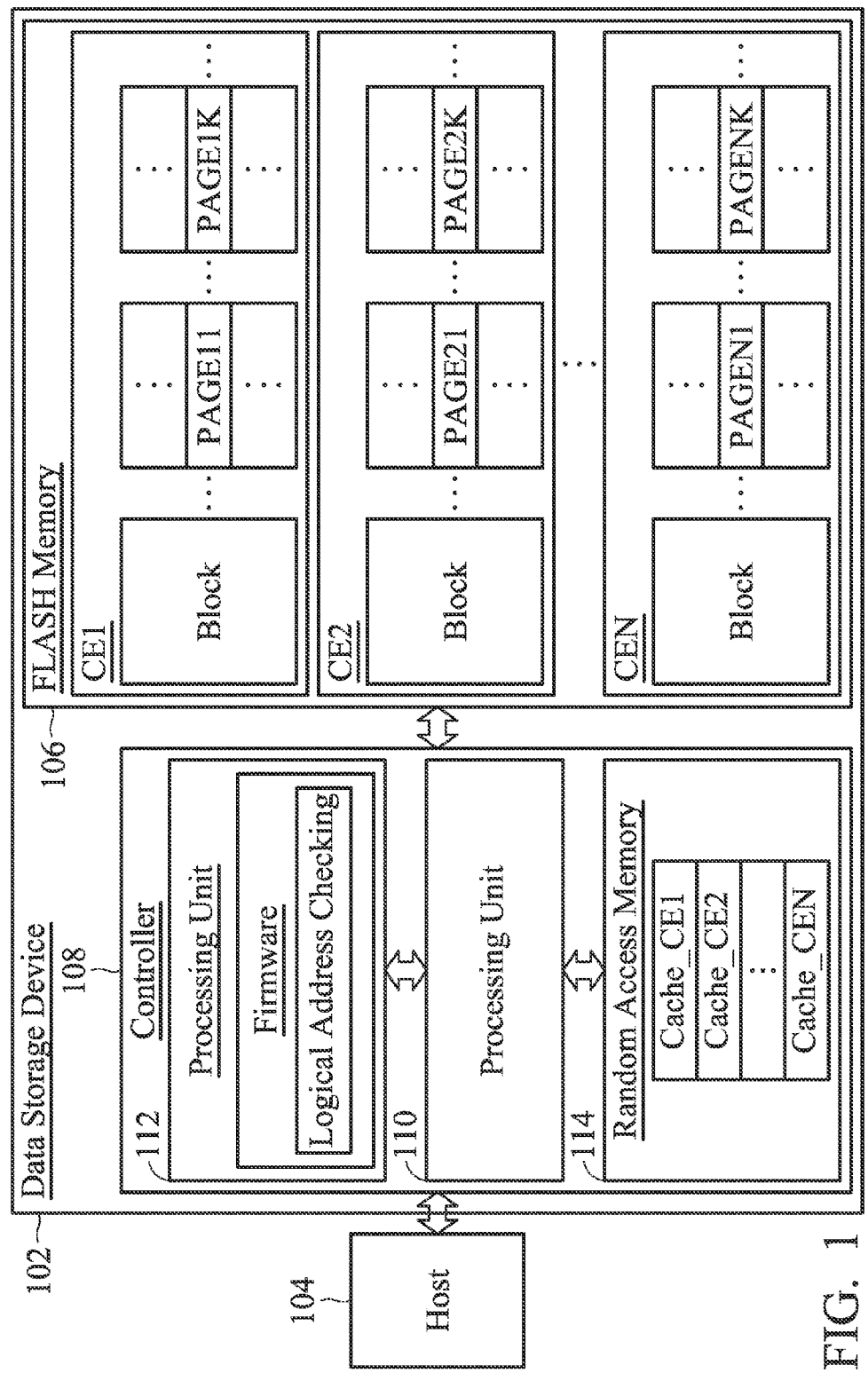
FIG. 1 depicts a data storage device 102 in accordance with an exemplary embodiment of the invention, which communicates with a host 104.

FIG. 1 depicts a data storage device 102 in accordance with an exemplary embodiment of the invention, which communicates with a host 104. The data storage device 102 comprises a FLASH memory 106 and a controller 108.

The architecture of the FLASH memory 106 is discussed in this paragraph. To process multiple commands at the same time, the blocks of the FLASH memory 106 are divided into groups to be accessed via different channels. As shown, the FLASH memory 106 includes multiple chips CE1, CE2 . . . CEN (e.g., which are chip enabled.) Each chip corresponds to one channel. Thus, multiple channels are provided to access the FLASH memory 106. The multiple channels are named CE1, CE2 . . . CEN with respect to the multiple chips. In each chip, the storage space is divided into a plurality of blocks. Each block comprises a plurality of pages. The symbols PAGE11~PAGENK each indicate one page. For a single chip, only one single access operation is allowed at the same time. However, for the FLASH memory 106 in the structure of multiple channels, multiple access operations are allowed at the same time.

The controller 108 is discussed in the following paragraph.

The controller 108 is coupled to the FLASH memory 106, and comprises a processing unit 110, a read only memory 112 and a random access memory 114. The codes loaded in the read only memory 112 are executed by the processing unit 110 as firmware of the data storage device 102. According to the processing unit 110 executing the firmware, the random access memory 114 is allocated to provide a cache space, which comprises a plurality of cache areas Cache_CE1, Cache_CE2 . . . Cache_CEN caching write data for the different channels CE1, CE2 . . . CEN, respectively. By the processing unit 110 executing the firmware, data issued from the host 104 is distributed to correspond to the different channels CE1, CE2 . . . CEN and thereby cached by the different cache areas Cache_CE1, Cache_CE2 . . . Cache_CEN, separately, to be integrated with data read out from the FLASH memory 106. The data after integration is uploaded onto the FLASH memory 106 via the channels corresponding thereto. In an exemplary embodiment, the cache areas Cache_CE1, Cache_CE2 . . . Cache_CEN are each in the size of a super page. Each super page is in the size of K pages. K is a number. Data integrated in the cache area Cache_CE1 is uploaded onto the FLASH memory 106 via the channel CE1, and is distributed to K pages PAGE11 to PAGE1K of K different blocks. Data integrated in the cache area Cache_CE2 is uploaded onto the FLASH memory 106 via the channel CE2, and is distributed to K pages PAGE21 to PAGE2K of K different blocks. Data integrated in the cache area Cache_CEN is uploaded onto the FLASH memory 106 via the channel CEN, and is distributed to K pages PAGEN1 to PAGENK of K different blocks. By the super page design, just one write command is required to write data into K pages of K different blocks of a channel. Thus, the number of write commands is considerably reduced.

Figure 2:
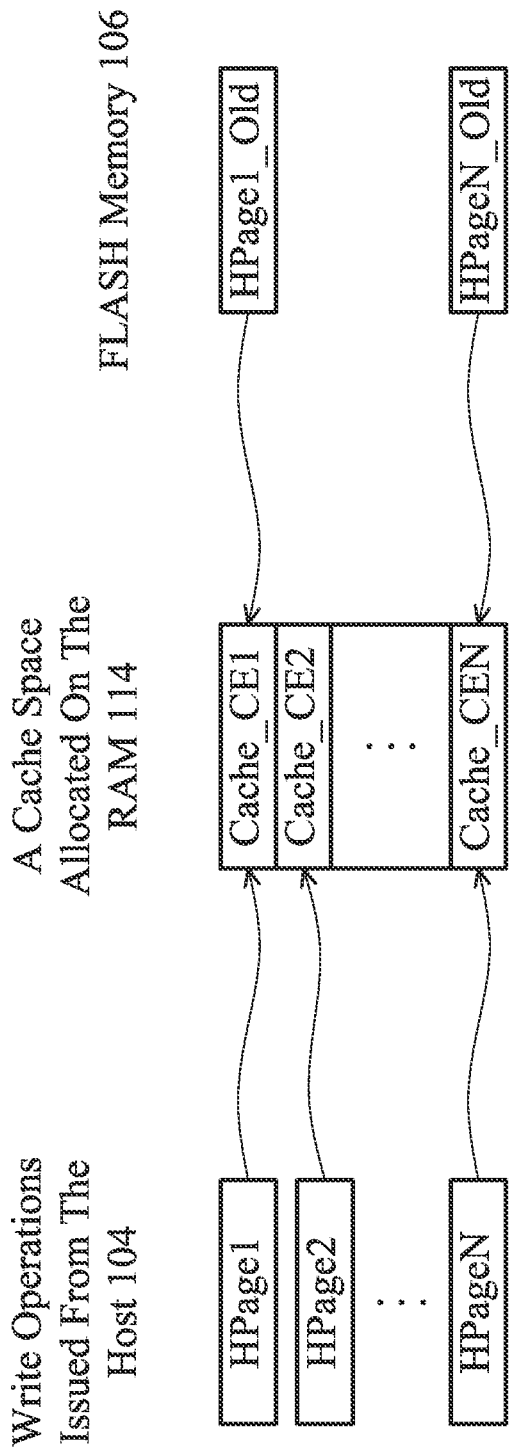
FIG. 2 depicts an exemplary embodiment of the invention, wherein a write operation issued from the host 104 covers several logical addresses HPage1, HPage2 . . . HPageN, which are non-repetitive and are not necessarily consecutive.
Figure 3:
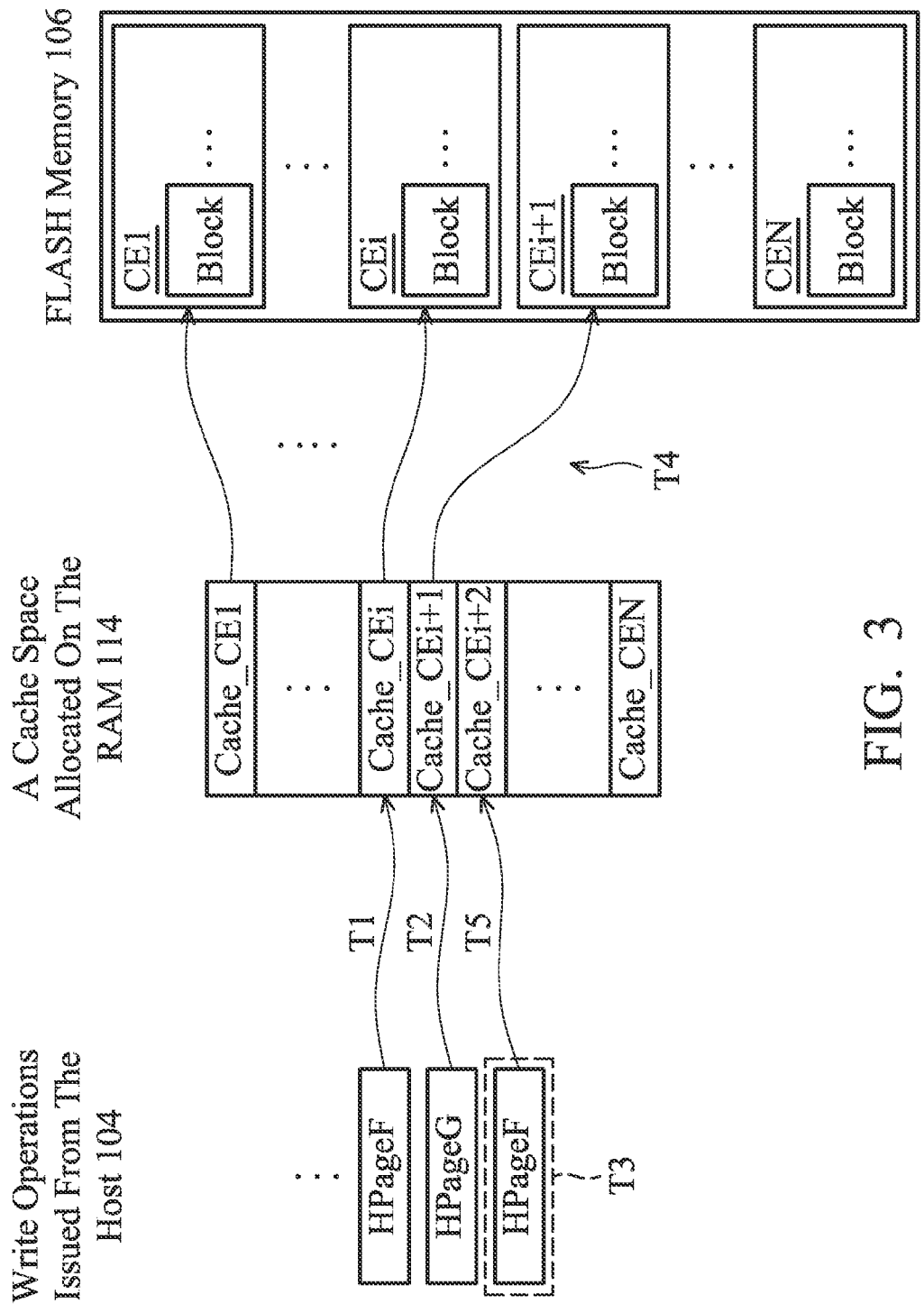
FIG. 3 depicts another exemplary embodiment of the invention, wherein a write operation issued by the host 104 covers logical addresses HPageF, HPageG, and HPageF in turn, the logical address HPageF is written twice in a non-consecutive manner.
Figure 4:
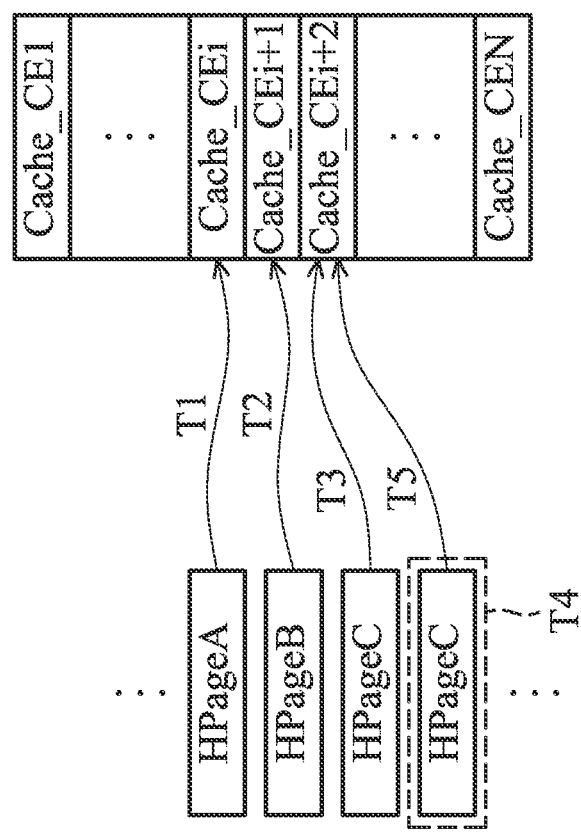
FIG. 4 depicts another exemplary embodiment of the invention, wherein a write operation issued by the host 104 covers logical addresses HPageA, HPageB, HPageC and HPageC in turn, the logical address HPageC is written twice in a consecutive manner.

In some exemplary embodiments, the logical address issued by the host 104 to be written with data is further taken into consideration in the utilization of the cache space (including cache areas Cache_CE1, Cache_CE2 . . . Cache_CEN). As shown, a logical address-checking mechanism may be provided in the firmware. In FIG. 2, FIG. 3 and FIG. 4, it is shown how the cache space is utilized based on the logical addresses requested to be written with data.

Referring to FIG. 2, the write command issued from the host 104 covers several logical addresses HPage1, HPage2 . . . HPageN, which are non-repetitive and are not necessarily consecutive. According to the processing unit 110, the different logical addresses HPage1, HPage2 . . . HPageN are separately assigned to correspond to the different channels CE1, CE2 . . . CEN. Accordingly, the data issued by the host 104 to be written into the logical addresses HPage1, HPage2 . . . HPageN is distributed and then cached by the different cache areas Cache_CE1, Cache_CE2 . . . Cache_CEN. As shown, the write data for the logical address HPage1 is cached by the cache area Cache_CE1, the write data for the logical address HPage2 is cached by the cache area Cache_CE2, similarly, up to the logical address HPageN, the write data corresponding thereto is cached by the cache area Cache_CEN. For a logical address in which just a partial space is requested to be updated, the write data is cached into the cache area corresponding thereto to be combined with the data (no need to update) read out from the FLASH memory 106. For example, for the beginning logical address HPage1 and the ending logical address HPageN of the write operation requested in FIG. 2, the data HPage1_Old and the data HPageN_Old (no need to update) are downloaded from the FLASH memory 106 to the cache areas Cache_CE1 and Cache_CEN, respectively, to be combined with the write data issued from the host 104 and cached in the cache areas Cache_CE1 and Cache_CEN. In this manner, the complete data of the logical addresses HPage1, HPage2 . . . HPageN are integrated in the cache areas Cache_CE1, Cache_CE2 . . . Cache_CEN, respectively. When the cache space (including cache areas Cache_CE1, Cache_CE2 . . . Cache_CEN) is filled, the data is uploaded to the FLASH memory 106 via the channels CE1, CE2 . . . CEN corresponding to the cache areas Cache_CE1, Cache_CE2 . . . Cache_CEN.

Referring to FIG. 3, the write operation issued from the host 104 is in an order of logical addresses HPageF, HPageG and HPageF. The logical address HPageF is written twice in a non-consecutive manner. The operations of the processing unit 110 are discussed in detail. In time T1, the write data for the logical address HPageF is cached in the cache area Cache_ CEi. In time T2 the write data for the logical address HPageG is cached in the cache area CacheCEi+1. In time T3, the host 104 issues a write command to write the logical address HPageF again. By executing the firmware, the processing unit 110 observes that the logical address HPageF has been cached in a non-latest-updated cache area Cache_CEi (compared to the latest-updated cache area Cache_CEi+1, the cache areas Cache_CE1 to Cache_CEi are the non-latest-updated cache area.) Thus, in time T4, the data previously cached in the cache areas Cache_CE1 to Cache_CEi+1 is uploaded onto the FLASH memory 106 via the channels CE1 to CEi+1, respectively. As for the write data that the host 104 issues for the logical address HPageF in time T3, it is cached by the subsequent cache area Cache_CEi+2 in time T5. When an unexpected power failure occurs, according to the disclosed technique, the update of the FLASH memory 106 still complies with the order of the write operations issued by the host 104. Thus, the updates at the logical addresses are in he correct order. As for the cache area Cache_CEi+2 and the remaining cache areas (up to Cache_CEN), the data therein may be uploaded onto the FLASH memory 106 via the channels CEi+2 to CEN, respectively, when the terminal cache area Cache_CEN of the cache space is filled.

Referring to FIG. 4, the host 104 issues write commands for logical addresses HPageA and HPageB, HPageC and HPageC. The logical address HPageC is written twice in a consecutive manner. The operations of the processing unit 110 are discussed in detail. At time T1, the write data for the logical address HPageA is cached in the cache area Cache_ CEi. At time T2, the write data for the logical address HPageB is cached in the cache area Cache_CEi+1. At time T3, the write data for the logical address HPageC is cached in the cache area Cache CEi+2. In time T4, the host 104 issues a write command for the logical address HPageC again, and the processing unit 110 executing the firmware is aware that the latest-updated cache area Cache_CEi+2 has been allocated to the logical address HPageC. In time T5, the processing unit 110 executing the firmware reuses the latest-updated cache area Cache CEi+2 to cache the write data of the logical address HPageC. In this manner, the cache space, including cache areas Cache_CE1, Cache_CE2 . . . Cache_CEN, is managed effectively.

Figure 5:
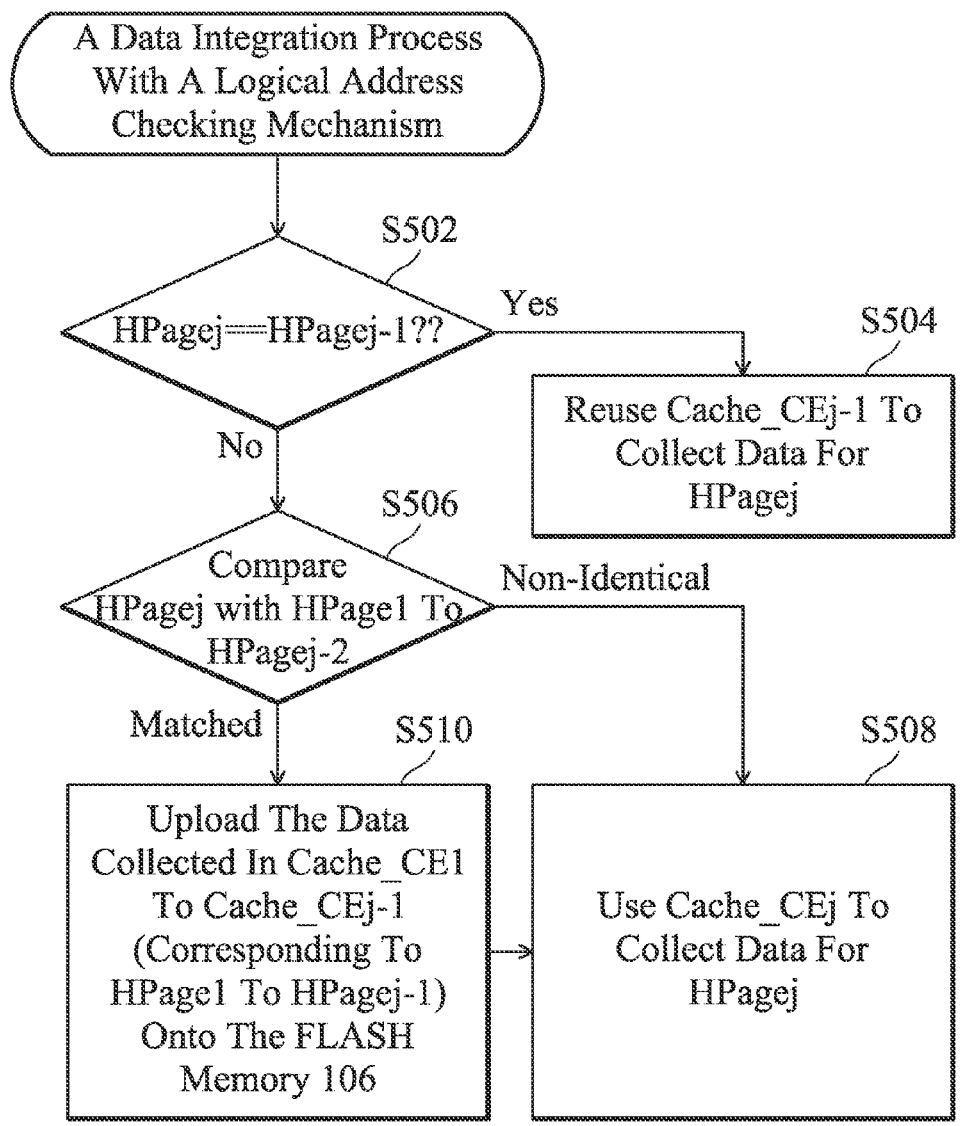
FIG. 5 is a flowchart depicting a data integration process with a logical address-checking mechanism in accordance with an exemplary embodiment of the invention.

FIG. 5 is a flowchart depicting a data integration process with a logical address-checking mechanism in accordance with an exemplary embodiment of the invention. The logical address to be written with data according to the write operation issued by the host 104 is HPagej. In step S502, the logical address HPagej is compared with the logical address HPagej−1. Note that the logical address HPagej−1 corresponds to the latest-updated-cache area Cache_CEj−1. When the logical address HPagej is identical to the logical address HPagej−1, step S504 is performed to reuse the cache area Cache_CEj−1 to collect data for the logical address HPagej. When the logical address HPagej is different from the logical address HPagej−1, step S506 is performed to compare the logical address HPagej with the logical addresses HPage1 to HPagej−2 corresponding to the non-latest-updated cache areas Cache_CE1 to Cache_CEj−2. When the logical address HPagej is different from all of the logical addresses HPage1 to HPagej−2, step S508 is performed to use the subsequent cache area Cache_CEj within the cache space to collect data for the logical address HPagej. When the logical address HPagej is identical to any of the previously allocated logical addresses HPage1 to HPagej−2, step S510 is performed before step S508. In step S510, through the channels CE1 to CEj−1 exclusive to the cache areas Cache_CE1 to Cache_CEj−1, respectively, the data collected in the cache areas Cache_CE1 to Cache_CEj−1 is uploaded onto the FLASH memory 106. In step S508, performed after step S510, the data for the logical address HPagej is collected by the subsequent cache area Cache_CEj within the cache space.

Figure 6:
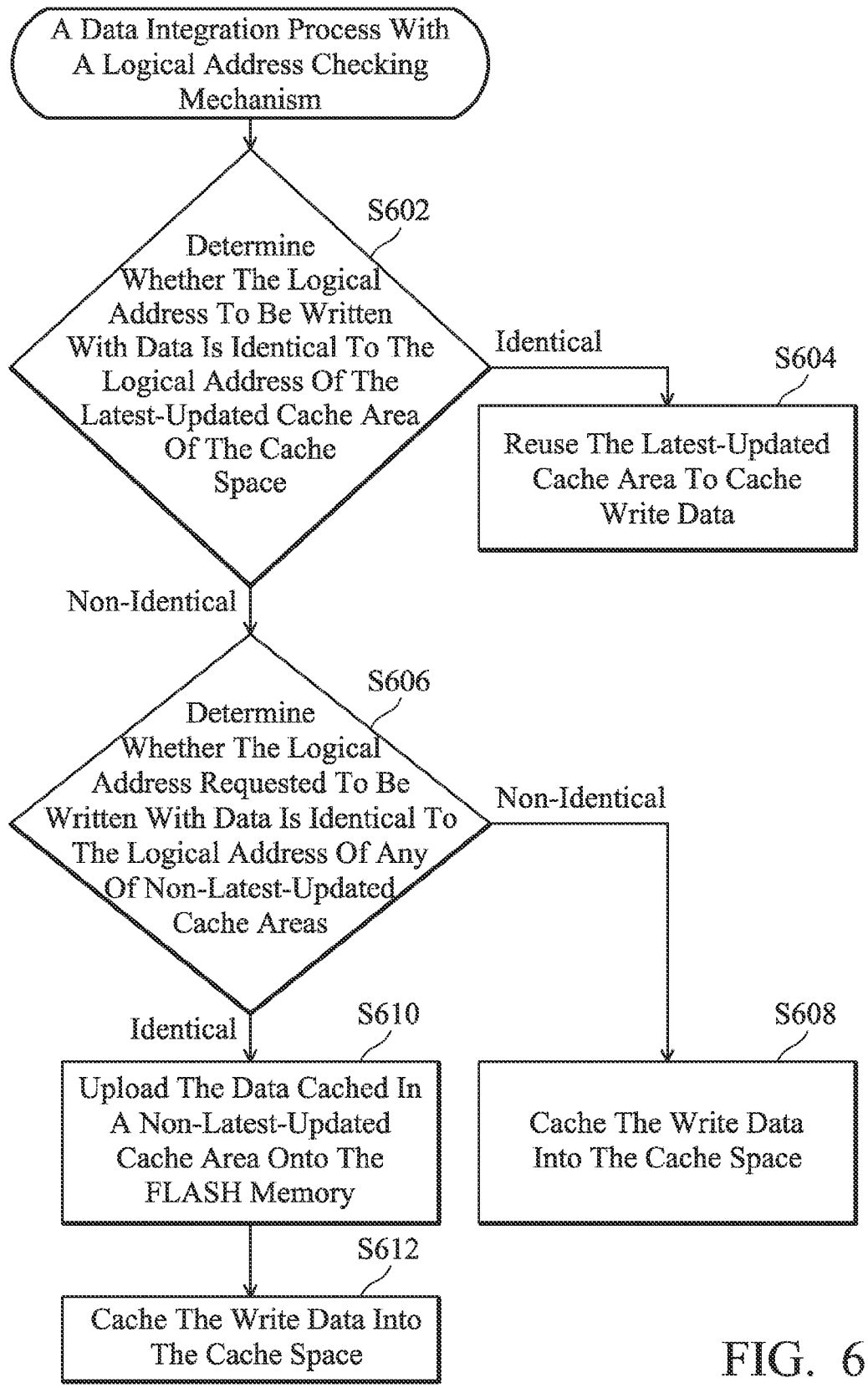
FIG. 6 is a flowchart depicting a data-integration process with a logical address-checking mechanism in accordance with another exemplary embodiment of the invention.

FIG. 6 is a flowchart depicting a data-integration process with a logical address-checking mechanism in accordance with another exemplary embodiment of the invention. In step S602, it is determined whether the logical address to be written with data is identical to the logical address of the latest-updated cache area of the cache space. If yes, step S604 is performed by which the latest-updated cache area is reused to cache write data. When it is determined in step S602 that the logical address to be written with data is not identical to the logical address of the latest-updated cache area of cache space, step S606 is performed to determine whether the logical address requested to be written with data is identical to the logical address of any of the non-latest-updated cache areas. When non-identical, step S608 is performed and the write data is cached into the cache space. When it is determined in step S606 that the logical address requested to be written with data is identical to a logical address of a non-latest-updated cache area, step S610 is performed, by which the data cached in a non-latest-updated cache area is uploaded onto the FLASH memory. After step S610, step S612 is performed by which the write data is cached into the cache space.

The disclosed data storage device may be a memory card, a USB FLASH device, a SSD and so on. In another exemplary embodiment, a NAND FLASH chip and a control chip are packaged into one package by a multi-chip package technique, to form a eMMC.

According to the aforementioned techniques, codes are programed for firmware implementation. The codes may be loaded into the read only memory 112 to be executed by the processing unit 110. However, the structure of the controller 108 is not intended to limit the controller architecture. Any technology using the same concept to control a FLASH memory is within the scope of the invention. In some exemplary embodiments, FLASH memory control methods are further disclosed, which are not limited to being performed by the controller structure of 108.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
 a FLASH memory, comprising a plurality of blocks each with a plurality of pages, wherein the blocks of the FLASH memory are grouped to be accessed via different channels;
 a controller coupled to the FLASH memory, comprising:
  a processing unit;
  a read only memory, loaded with codes which are executed by the processing unit as firmware of the data storage device; and
  a random access memory, allocated by the processing unit executing the firmware, to provide a cache space which comprises a plurality of cache areas caching write data for the different channels, respectively,
 wherein:
 by the processing unit executing the firmware, data issued from a host is distributed to correspond to the different channels; and
 when a logical address requested to be written with data is identical to a logical address that a latest-updated cache area of the cache space corresponds to, the processing unit executing the firmware reuses the latest-updated cache area to cache write data.

2. The data storage device as claimed in claim 1, wherein when the logical address requested to be written with data is identical to a logical address that a non-latest-updated cache area of the cache space corresponds to, the processing unit executing the firmware uploads the data cached in the non-latest-updated cache area onto the FLASH memory.

3. The data storage device as claimed in claim 2, wherein the write data with a the cache space by the processing unit executing the firmware after the data cached in the non-latest-updated cache area is uploaded onto the FLASH memory.

4. The data storage device as claimed in claim 1, wherein:
 when a terminal cache area of the cache space is filled, the processing unit executing the firmware uploads the data cached in the different cache areas of the cache space onto the FLASH memory via the different channels.

5. The data storage device as claimed in claim 1, wherein:
 when the logical address requested to be written with data is identical to the logical address that the latest-updated cache area of the cache space corresponds to, the processing unit executing the firmware keeps using the latest-updated cache area to integrate data for the logical address that the latest-updated cache area corresponds to.

6. The data storage device as claimed in claim 1, wherein:
 the processing unit executing the firmware distributes the data issued from the host to correspond to the different channels and integrated separately with the data cached in the different cache areas of the cache space.

7. A FLASH memory control method, comprising:
 using a plurality of channels to access a FLASH memory, wherein the FLASH memory comprises a plurality of blocks each with a plurality of pages, and the blocks are grouped to be accessed by the different channels;
 allocating a random access memory to provide a cache space, the cache space comprising a plurality of cache areas caching write data for the different channels, respectively;
 distributing the data issued from a host to correspond to the different channels; and
 reusing a latest-updated cache area of the cache space to cache write data when a logical address requested to be written with data is identical to a logical address that the latest-updated cache area corresponds to.

8. The FLASH memory control method as claimed in claim 7, further comprising:
 uploading the data cached in a non-latest-updated cache area of the cache space onto the FLASH memory when the logical address requested to be written with data is identical to the logical address that the non-latest-updated cache area corresponds to.

9. The FLASH memory control method as claimed in claim 8, wherein:
 the write data with a logical address identical to that for the non-latest-updated cache area is cached into the cache space after the data cached in the non-latest-updated cache area is uploaded onto the FLASH memory.

10. The FLASH memory control method as claimed in claim 7, further comprising:
 uploading the data cached in the different cache areas of the cache space onto the FLASH memory via the different channels when a terminal cache area of the cache space is filled.

11. The FLASH memory control method as claimed in claim 7, wherein:
 when the logical address requested to be written with data is identical to the logical address that the latest-updated cache area corresponds to, the latest-updated cache area is continuously used in integrating data for the logical address that the latest-updated cache area corresponds to.

12. The FLASH memory control method as claimed in claim 7, wherein the data issued from the host is distributed to correspond to the different channels and integrated separately with the data cached in the different cache areas of the cache space.

* * * * *